United States Patent
Peng et al.

(10) Patent No.: US 12,364,942 B2
(45) Date of Patent: Jul. 22, 2025

(54) FILTERING AND SEPARATING SYSTEM AND METHOD FOR RECYCLING Fe3O4 NANO-PARTICLES

(71) Applicant: FEATURE-TEC (WUXI) FILTRATION TECHNOLOGY CO., LTD, Wuxi (CN)

(72) Inventors: Bin Peng, Wuxi (CN); Xiangyang He, Wuxi (CN)

(73) Assignee: FEATURE-TEC (WUXI) FILTRATION TECHNOLOGY CO., LTD, Wuxi (CN)

(*) Notice: Subject to any disclaimer, the term of this patent is extended or adjusted under 35 U.S.C. 154(b) by 279 days.

(21) Appl. No.: 17/926,140

(22) PCT Filed: Aug. 13, 2021

(86) PCT No.: PCT/CN2021/112391
§ 371 (c)(1),
(2) Date: Nov. 18, 2022

(87) PCT Pub. No.: WO2022/142363
PCT Pub. Date: Jul. 7, 2022

(65) Prior Publication Data
US 2023/0321567 A1    Oct. 12, 2023

(30) Foreign Application Priority Data
Dec. 31, 2020    (CN) .................. 202011636895.X

(51) Int. Cl.
*B01D 36/02*    (2006.01)
*B03C 1/30*    (2006.01)

(52) U.S. Cl.
CPC ................ *B01D 36/02* (2013.01); *B03C 1/30* (2013.01)

(58) Field of Classification Search
CPC ............ B01D 36/02; B01D 35/06; B03C 1/30
See application file for complete search history.

(56) References Cited

U.S. PATENT DOCUMENTS

2012/0018382 A1*    1/2012    Stein .................. B03C 1/00
                                                                      977/773

FOREIGN PATENT DOCUMENTS

| CN | 102784515 Y | 11/2012 |
| CN | 203154951 A | 8/2013 |

(Continued)

OTHER PUBLICATIONS

Machine Translation of CN 210356317 to Yang (Apr. 21, 2020) (Year: 2020).*

(Continued)

*Primary Examiner* — Daniel C. McCracken
(74) *Attorney, Agent, or Firm* — Hawaii Patent Services; Nathaniel K. Fedde; Kenton N. Fedde

(57) ABSTRACT

The present invention provides a filtering and separating system and method for recycling $Fe_3O_4$ nano-particles. The system includes an original liquid tank, a first booster pump, a clustered filter, an electromagnetic filtering machine, a dynamic membrane system and a nano-particle collecting tank; and a concentrated liquid outlet of the dynamic membrane system is connected with a material inlet of the clustered filter, and a material outlet of the electromagnetic filtering machine is also connected with the nano-particle collecting tank. According to the method, the $Fe_3O_4$ nano-particles in the original liquid tank are separated and collected by the electromagnetic filtering machine, and remaining impurities are collected by the clustered filter, so that a filtering and separating purpose is realized; water purified by a reverse osmosis membrane system is used for washing the $Fe_3O_4$ nano-particles, thereby reducing the waste of resources; and a spray drying apparatus is arranged in the (Continued)

electromagnetic filtering machine, and may dry the washed $Fe_3O_4$ nano-particles, so that the recycled $Fe_3O_4$ nano-particles may be used directly, and the efficiency is higher. The method is short in process flow, high in separation efficiency, and capable of maximizing the effective use of the resources; and materials treated by the method is low in moisture, and can be conveniently used directly.

10 Claims, 1 Drawing Sheet

(56) References Cited

FOREIGN PATENT DOCUMENTS

| | | | | |
|---|---|---|---|---|
| CN | 210356317 | * | 4/2020 | ............ B01D 36/02 |
| CN | 210356317 Y | | 4/2020 | |
| CN | 210699026 Y | | 6/2020 | |
| CN | 112807840 | | 5/2021 | |

OTHER PUBLICATIONS

English Translation of the Written Opinion of the International Searching Authority in PCT/CN2021/112391 (Nov. 3, 2021) (Year: 2021).*

Lee, et al., An Experimental Study on the Characteristics of Electromagnetic Filter, Journal of the Korean Nuclear Society, Journal of the Korean Nuclear Society 1993; 25(1): 178-191 (Year: 1993).*

* cited by examiner

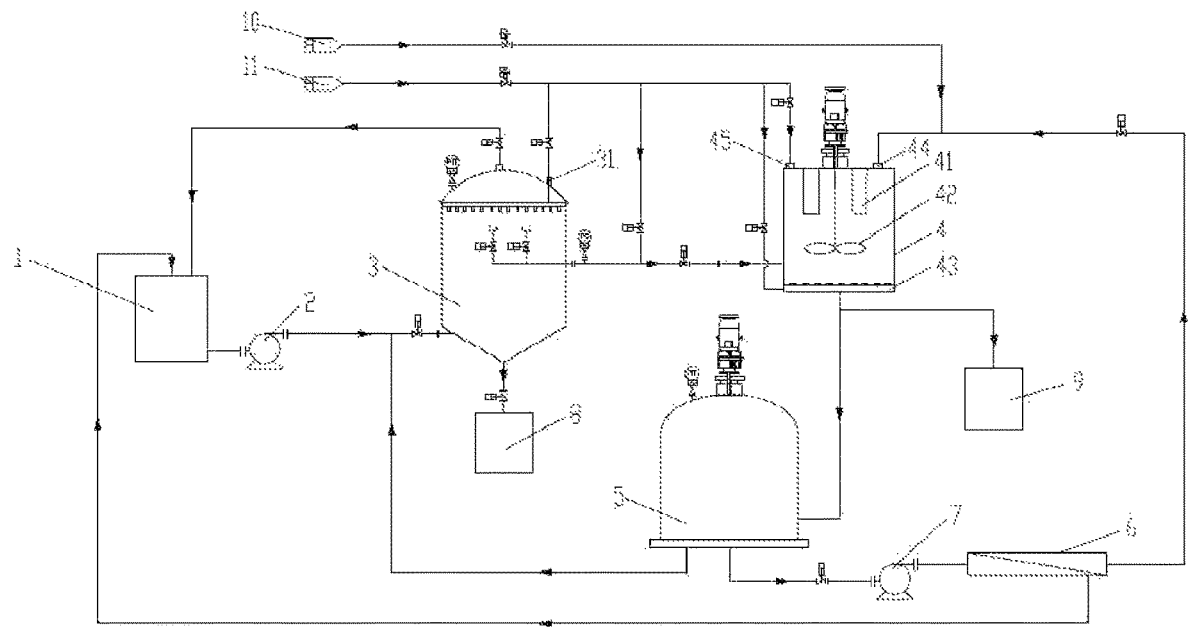

FILTERING AND SEPARATING SYSTEM AND METHOD FOR RECYCLING Fe3O4 NANO-PARTICLES

TECHNICAL FIELD

The present invention relates to the technical field of separation and purification of nano-particles, and particularly relates to a filtering and separating system and method for recycling Fe3O4 nano-particles.

BACKGROUND

Magnetic nano-materials are a novel kind of nano-materials with rapid development and important application value in recent years, and a main component is iron oxide (Fe3O4). Under the action of an external magnetic field, magnetic nano-particles can show a characteristic of directional migration. Because of a nano-scale size effect and unique magnetic characteristics, the nano-materials have good application prospect in various fields.

Magnetic nano-particles emitted during human activities are first released into an atmospheric environment, and these magnetic nano-particles are important components and main metal nano-particles in the atmospheric particulate matters (pm2.5). The magnetic nano-particles enter the human body with the atmospheric particulate matters, and are first deposited in the lungs through tracheas, which may cause chronic inflammation, epithelial tissue damage and pulmonary fibrosis of the lung tissues, and eventually lead to the pneumoconiosis. The magnetic nano-particles may also enter a blood circulation system through a respiratory system, and cause cardiovascular diseases.

The nano-particles need to be separated and purified for preparing high-quality products when ferrous metal nano-particles are prepared, and moreover, a large number of ferrous metal nano-particles may be produced during the operation of transport machines such as cars, ships, airplanes, etc. In order to prevent these nano-particles from flying into the air and influencing the environment, people generally store the nano-particles together with water or other solvents, and then centralize the nano-particles for treatment. In the prior art, the treatment for the waste liquid may cause secondary pollution; and moreover, it may be impossible to recycle the magnetic nano-particles, which results in the waste of resources.

In view of this, it is necessary to improve an apparatus and method for recycling magnetic nano-particles in the prior art, so as to solve the above problems.

SUMMARY

A first purpose of the present invention discloses a filtering and separating system for recycling Fe3O4 nano-particles. According to the system, nano-particles in slurry are absorbed onto magnetic poles through an electromagnetic filtering machine, and remaining liquid is treated by a dynamic membrane system and a clustered filter so as to remove large particulate matters therein. The treated liquid is used for washing through a reverse osmosis membrane system so as to realize the cyclic use of resources and efficient recycling.

In order to realize the above purpose, the present invention discloses a filtering and separating system for recycling Fe3O4 nano-particles, which includes an original liquid tank, a first booster pump, a clustered filter, an electromagnetic filtering machine, a dynamic membrane system and a nano-particle collecting tank; the first booster pump is connected with material inlets of the original liquid tank and the clustered filter respectively through pipelines; a material outlet of the clustered filter is connected with a material inlet of the electromagnetic filtering machine; a material outlet of the electromagnetic filtering machine is connected with a material inlet of the dynamic membrane system; a concentrated liquid outlet of the dynamic membrane system is connected with the material inlet of the clustered filter; and the material outlet of the electromagnetic filtering machine is also connected with the nano-particle collecting tank.

In some embodiments, the system further includes a second booster pump and a reverse osmosis membrane system, and a clear liquid outlet of the dynamic membrane system is connected with the reverse osmosis membrane system through the second booster pump.

In some embodiments, a clear liquid outlet of the reverse osmosis membrane system is connected to a liquid inlet of the electromagnetic filtering machine, and a concentrated liquid outlet of the reverse osmosis membrane system is connected to the original liquid tank.

In some embodiments, a sediment discharging valve at a bottom of the clustered filter is connected with a sediment collecting tank.

In some embodiments, magnetic poles, a spiral stirrer and an aeration apparatus are arranged in the electromagnetic filtering machine.

In some embodiments, a periphery of an inner wall of the electromagnetic filtering machine is also provided with a spray drying apparatus.

In some embodiments, the liquid inlet at a top of the electromagnetic filtering machine is also connected with a solvent tank.

In some embodiments, a second, air inlet at the top of the electromagnetic filtering machine is connected with a compressed air tank.

In some embodiments, the compressed air tank is connected to a first air inlet and a liquid outlet of the clustered filter, and the compressed air tank is also connected to the aeration apparatus.

A second purpose of the present invention discloses a method for recycling Fe3O4 nano-particles, which utilizes a clustered filter, an electromagnetic filtering machine and a dynamic membrane system to design an optimum process to realize the cyclic use of resources and rapidly separate the Fe3O4 nano-particles.

In order to realize the above purpose, the present invention discloses a filtering and separating method for recycling Fe3O4 nano-particles, which includes the following steps:

Step I: pumping slurry into the clustered filter; after the clustered filter is filled fully with the liquid, refluxing the slurry into an original liquid tank, and beginning to run the clustered filter; enabling the magnetic nano-particles to enter the electromagnetic filtering machine; and intercepting large particulate matters in the clustered filter;

Step II: powering on the electromagnetic filtering machine, and initiating a spiral stirrer, an aeration apparatus and magnetic poles to absorb the magnetic nano-particles, wherein the treatment time is 10-30 min;

Step III: opening a liquid outlet of the electromagnetic filtering machine, conveying the liquid to the dynamic membrane system for treatment, and returning the treated concentrated liquid into the clustered filter for cyclic filtration;

Step IV: pumping clear liquid treated in the step III into a reverse osmosis membrane system for treatment through a second booster pump; sending pure water obtained by the treatment into the electromagnetic filtering machine to wash the magnetic nano-particles; and refluxing concentrated water into the original liquid tank to dilute the slurry;

Step V: after washing, powering on a spray drying apparatus in the electromagnetic filtering machine to perform spray drying treatment for the magnetic nano-particles to remove moisture in the magnetic nano-particles; and Step VI: after drying, powering off the magnetic poles, the spiral stirrer and the aeration apparatus, and opening a second air inlet to pneumatically convey the magnetic nano-particles into a nano-particle collecting tank, to complete the recycling work.

Compared with the prior art, the present invention has the beneficial effects as follows: (1) the electromagnetic filtering machine absorbs the magnetic nano-particles onto the magnetic poles, and the remaining liquid is treated by the clustered filter and the dynamic membrane system, so that the separation effect is better; (2) the water purified by the reverse osmosis membrane system is used for washing the magnetic nano-particles, thereby reducing the waste of resources: and (3) the spray drying apparatus is arranged in the electromagnetic filtering machine, and may dry the washed magnetic nano-particles, so that the recycled magnetic nano-particles may be used directly, and the efficiency is higher.

DESCRIPTION OF DRAWINGS

FIG. 1 is a structural schematic diagram of a filtering and separating system for recycling Fe3O4 nano-particles shown in the present invention.

Reference numerals: 1, original liquid tank; 2, first booster pump; 3, clustered filter; 31, first air inlet; 4, electromagnetic filtering machine; 41, magnetic pole; 42, spiral stirrer; 43, aeration apparatus; 44, liquid inlet; 45, second air inlet; 5, dynamic membrane system; 6, reverse osmosis membrane system; 7, second booster pump; 8, sediment collecting tank; 9, nano-particle collecting tank; 10, solvent tank; 11, compressed air tank.

DETAILED DESCRIPTION

The present invention is described in detail below in combination with various embodiments shown in the drawings; however, it should be noted that the embodiments do not limit the present invention. Functions, methods or structural equivalent changes or substitutions made by those ordinary skilled in the art according to the embodiments shall fall with the protection scope of the present invention.

As shown in FIG. 1, a filtering and separating system for recycling $Fe_3O_4$ nano-particles includes an original liquid tank 1, a first booster pump 2, a clustered filter 3, an electromagnetic filtering machine 4, a dynamic membrane system 5 and a nano-particle collecting tank 9; the first booster pump 2 is connected with material inlets of the original liquid tank 1 and the clustered filter 3 respectively through pipelines; a material outlet of the clustered filter 3 is connected with a material inlet of the electromagnetic filtering machine 4; a material outlet of the electromagnetic filtering machine 4 is connected with a material inlet of the dynamic membrane system 5; a concentrated liquid outlet of the dynamic membrane system 5 is connected with the material inlet of the clustered filter 3; and the material outlet of the electromagnetic filtering machine 4 is also connected with the nano-particle collecting tank 9.

The system further includes a second booster pump 7 and a reverse osmosis membrane system 6; and a clear liquid outlet of the dynamic membrane system 5 is connected with the reverse osmosis membrane system 6 through the second booster pump 7. A clear liquid outlet of the reverse osmosis membrane system 6 is connected to a liquid inlet 44 of the electromagnetic filtering machine 4, and a concentrated liquid outlet of the reverse osmosis membrane system 6 is connected to the original liquid tank 1.

A sediment discharging valve at the bottom of the clustered filter 3 is connected with a sediment collecting tank 8, and is used for collecting large particulate matters in the slurry.

Magnetic poles 41, a spiral stirrer 42 and an aeration apparatus 43 are arranged in the electromagnetic filtering machine 4. The periphery of an inner wall of the electromagnetic filtering machine 4 is also provided with a spray drying apparatus. The magnetic field intensity of the electromagnetic filtering machine 4 is 0.5-6 T, and the spiral stirrer 42 and the aeration apparatus 43 may enable the magnetic nano-particles in the electromagnetic filtering machine 4 to be scattered more uniformly, so that the magnetic poles 41 can better absorb the magnetic nano-particles conveniently.

The liquid inlet 44 at the top of the electromagnetic filtering machine 4 is also connected with a solvent tank 10, and a second air inlet 45 at the top of the electromagnetic filtering machine 4 is connected with a compressed air tank 11. Pure water and/or solvent may be used for washing the magnetic nano-particles.

The compressed air tank 11 is connected to a first air inlet 31 and a liquid outlet of the clustered, filter 3, and the compressed air tank 11 is also connected to the aeration apparatus 43.

As shown in FIG. 1, a filtering and separating method for recycling Fe3O4 nano-particles includes the following steps:

Step I: slurry is pumped into a clustered filter 3; after the clustered filter is filled fully with the slurry, the slurry is refluxed into an original liquid tank 1, and the clustered filter 3 begins to operate; the magnetic nano-particles enter an electromagnetic filtering machine 4; and large particulate matters are intercepted in the clustered filter 3.

Step II: the electromagnetic filtering machine 4 is powered on, and the spiral stirrer 42, the aeration apparatus 43 and the magnetic poles 41 are initiated to absorb the magnetic nano-particles, wherein treatment time is 10-30 min.

Step a liquid outlet of the electromagnetic filtering machine 4 is opened to convey the liquid to a dynamic membrane system 5 for treatment, and the treated concentrated liquid is returned into the clustered filter 3 for cyclic filtration.

Step IV: clear liquid treated in the step III is pumped into a reverse osmosis membrane system 6 for treatment through a second booster pump 7; pure water obtained by the treatment is sent into the electromagnetic filtering machine 4 to wash the magnetic nano-particles; and the concentrated water is refluxed into the original liquid tank 1 to dilute the slurry.

According to a working condition of the slurry in the original liquid tank 1, the magnetic nano-particles may be washed in a solvent and/or water washing manner.

Step V: after washing, a spray drying apparatus in the electromagnetic filtering machine 4 is powered on to perform spray drying treatment for the magnetic nano-particles to remove moisture in the magnetic nano-particles.

The spray drying apparatus may also use the solvent and/or pure water to simultaneously wash and dry the magnetic nano-particles.

Step VI: after drying, magnetic poles 41, a spiral stirrer 42 and an aeration apparatus 43 are powered off, and the magnetic nano-particles fall off from the magnetic poles 41 to the bottom of the electromagnetic filtering machine 4; and a second air inlet 45 is opened to pneumatically convey the magnetic nano-particles into a nano-particle collecting tank 9, to complete the recycling work.

According to the method, the slurry containing the $Fe_3O_4$ naon-particles is treated by the clustered filter 3, the electromagnetic filtering machine 4 and the dynamic membrane system 5; the Fe3O4 nano-particles in the slurry are recycled into the nano-particle collecting tank 9; and other large particulate matters in the slurry are concentrated and dried in the clustered filter 5, and finally collected into the sediment collecting tank 8.

A series of detailed descriptions listed above are only specific descriptions of feasible embodiments of the present invention, and are not intended to limit the protection scope of the present invention. Any equivalent embodiments or changes that do not depart from the technical spirit of the present invention shall fall within the protection scope of the present invention.

In addition, it should be understood that although this description is described according to the embodiments, each embodiment does not include only one independent technical solution. The illustration mode of this description is only for the sake of clarity. Those skilled in the art should take this description as a whole and the technical solutions in each embodiment can be combined appropriately to form other embodiments that can be understood by those skilled in the art.

The invention claimed is:

1. A filtering and separating system for recycling $Fe_3O_4$ nano-particles, comprising an original liquid tank (1), a first booster pump (2), a clustered filter (3), an electromagnetic filtering machine (4), a dynamic membrane system (5) and a nano-particle collecting tank (9);

the first booster pump (2) is connected with material inlets of the original liquid tank (1) and the clustered filter (3) respectively through pipelines; a material outlet of the clustered filter (3) is connected with a material inlet of the electromagnetic filtering machine (4); a material outlet of the electromagnetic filtering machine (4) is connected with a material inlet of the dynamic membrane system (5); a concentrated liquid outlet of the dynamic membrane system (5) is connected with the material inlet of the clustered filter (3); and the material outlet of the electromagnetic filtering machine (4) is also connected with the nano-particle collecting tank (9).

2. The filtering and separating system for recycling $Fe_3O_4$ nano-particles according to claim 1, further comprising a second booster pump (7) and a reverse osmosis membrane system (6), and a clear liquid outlet of the dynamic membrane system (5) is connected with the reverse osmosis membrane system (6) through the second booster pump (7).

3. The filtering and separating system for recycling $Fe_3O_4$ nano-particles according to claim 2, wherein a clear liquid outlet of the reverse osmosis membrane system (6) is connected to a liquid inlet (44) of the electromagnetic filtering machine (4), and a concentrated liquid outlet of the reverse osmosis membrane system (6) is connected to the original liquid tank (1).

4. The filtering and separating system for recycling $Fe_3O_4$ nano-particles according to claim 1, wherein a sediment discharging valve at a bottom of the clustered filter (3) is connected with a sediment collecting tank (8).

5. The filtering and separating system for recycling $Fe_3O_4$ nano-particles according to claim 1, wherein magnetic pales (41), a spiral stirrer (42) and an aeration apparatus (43) are arranged in the electromagnetic filtering machine (4).

6. The filtering and separating system for recycling $Fe_3O_4$ nano-particles according to claim 5, wherein, a periphery of an inner wall of the electromagnetic filtering machine (4) is also provided with a spray drying apparatus.

7. The filtering and separating system for recycling $Fe_3O_4$ nano-particles according to claim 6, wherein the liquid inlet (44) at a top of the electromagnetic filtering machine (4) is also connected with a solvent tank (10).

8. The filtering and separating system for recycling $Fe_3O_4$ nano-particles according to claim 7, wherein a second air inlet (45) at the top of the electromagnetic filtering machine (4) is connected with a compressed air tank (11).

9. The filtering and separating system for recycling $Fe_3O_4$ nano-particles according to claim 8, wherein the compressed air tank (11) is connected to a first air inlet (31) and a liquid outlet of the clustered filter (3), and the compressed air tank (11) is also connected to the aeration apparatus (43).

10. A filtering and separating method for recycling $Fe_3O_4$ nano-particles, comprising the following steps:

Step I: pumping slurry into the clustered filter (3); after the clustered filter is filled fully with the liquid, refluxing the slurry into an original liquid tank (1), and beginning to operate the clustered filter (3); enabling the magnetic nano-particles to enter the electromagnetic filtering machine (4); and intercepting large particulate matters in the clustered filter (3);

Step II: powering on the electromagnetic filtering machine (4), and initiating a spiral stirrer (42), an aeration apparatus (43) and magnetic poles (41) to absorb the magnetic nano-particles, wherein treatment time is 10-30 min;

Step III: opening a liquid outlet of the electromagnetic filtering machine (4), conveying the liquid to the dynamic membrane system (5) for treatment, and returning the treated concentrated liquid into the clustered filter (3) for cyclic filtration;

Step IV: pumping clear liquid treated in the step III into a reverse osmosis membrane system (6) for treatment through a second booster pump (7), sending pure water obtained by the treatment into the electromagnetic filtering machine (4) to wash the magnetic nano-particles, and refluxing concentrated water into the original liquid tank (1) to dilute the slurry;

Step V: after washing, powering on a spray drying apparatus in the electromagnetic filtering machine (4) to perform spray drying treatment for the magnetic nano-particles to remove moisture in the magnetic nano-particles; and Step VI: after drying, powering off the magnetic poles (41), the spiral stirrer (42) and the aeration apparatus (43), and opening a second air inlet (45) to pneumatically convey the magnetic nano-particles into a nano-particle collecting tank (9), to complete the recycling work.

* * * * *